Feb. 23, 1926.
A. F. DEMBEK
1,574,611
AUTOMOBILE TIRE
Filed Dec. 23, 1924
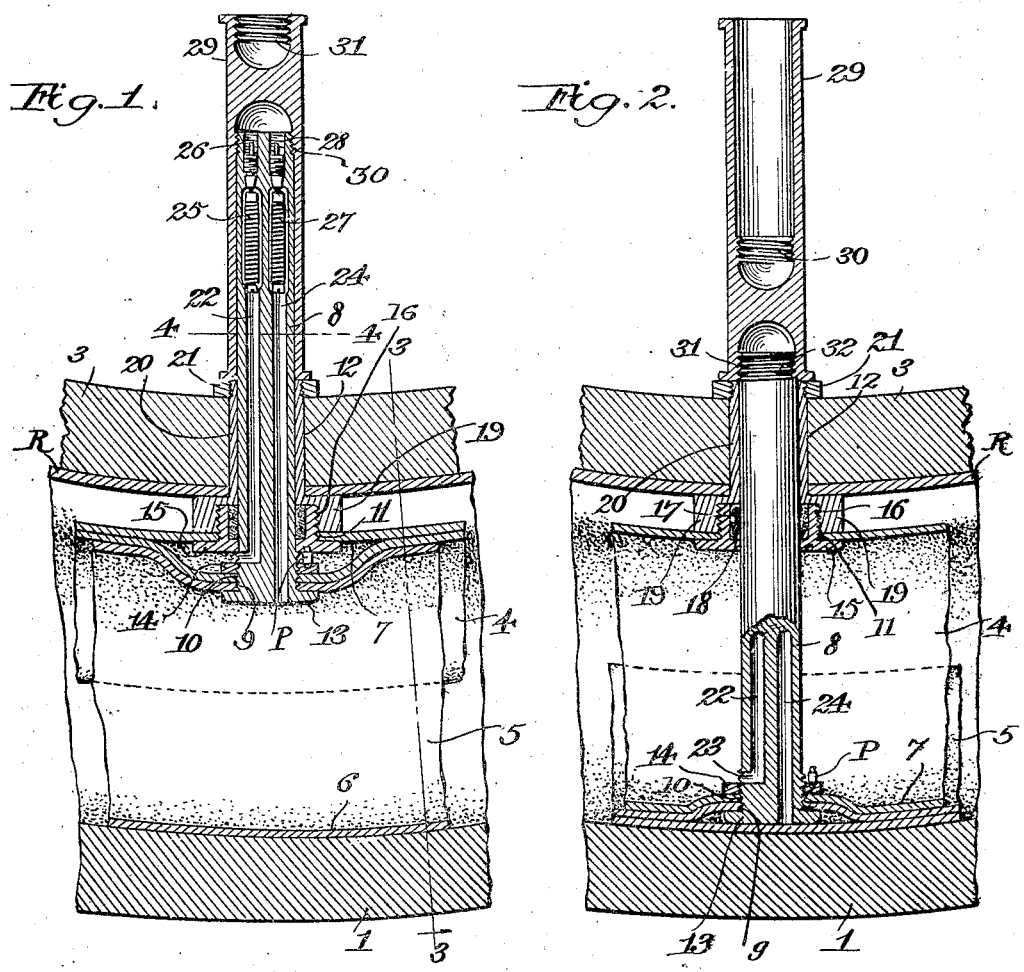
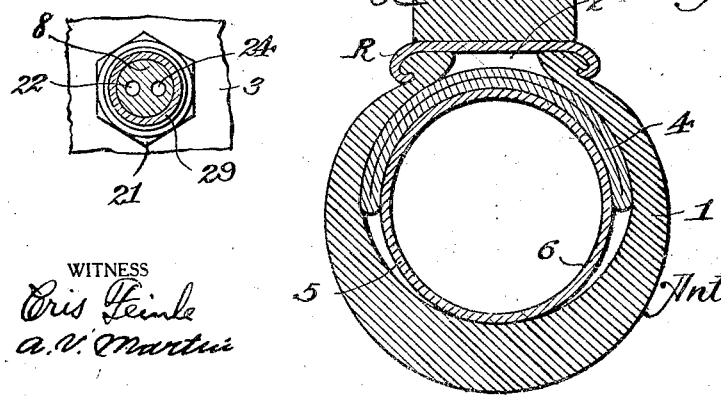
WITNESS
INVENTOR,
Anthony F. Dembek
BY
ATTORNEYS.

Patented Feb. 23, 1926.

1,574,611

UNITED STATES PATENT OFFICE.

ANTHONY F. DEMBEK, OF BROOKLYN, NEW YORK.

AUTOMOBILE TIRE.

Application filed December 23, 1924. Serial No. 757,710.

*To all whom it may concern:*

Be it known that I, ANTHONY F. DEMBEK, a citizen of Poland, but a declarant for citizenship of the United States, and a resident of the city of New York, borough of Brooklyn, in the county of Kings and State of New York, have invented certain new and useful Improvements in Automobile Tires, of which the following is a full, clear, and exact description.

This invention relates to improvements in tires for automobiles, more particularly to pneumatic tires, and it consists in the combinations, constructions and arrangements herein described and claimed.

An object of the invention is to provide a tire which is adapted when deflated to be quickly and easily placed on the felloe of a wheel and when inflated to retain its position on the felloe of the wheel.

A further object of the invention is to provide a pneumatic tire having a plurality of endless air chambers within the casing of the tire so that the tire will be effective to buoyantly support a wheel on which it is mounted even though the walls of one of said chambers shall have been punctured.

A further object of the invention is the production of a pneumatic tire having a plurality of independent inner tubes, and means in connection with each of said inner tubes permitting the inflation and deflation of the same.

A further object of the invention is the provision of a pneumatic tire having an outer casing adapted to be mounted on the felloe of a wheel and an inner endless pneumatic body which can be quickly and easily placed within the outer casing or removed therefrom when the inner pneumatic body is deflated and which when inflated will maintain the outer casing in its proper form and in place on the felloe of a wheel.

Other objects and advantages of the invention will be apparent from the following description, considered in conjunction with the accompanying drawings, in which—

Figure 1 is a sectional view through the longitudinal axis of a portion of the improved tire in place on the felloe of a wheel, showing one of the tube sections thereof inflated;

Figure 2 is a view similar to that of Figure 1 showing the other tube section inflated;

Figure 3 is a transverse section through the improved tire, the view being taken substantially along the line 3—3 of Figure 1;

Figure 4 is a section along the line 4—4 of Figure 1.

The improved tire comprises an outer casing 1 which is made of any suitable wear-resistant flexible material. The outer casing 1 has the form of an endless tube provided with a slot or narrow opening 2 extending in its inner peripheral portion circumferentially thereof. The outer casing 1 may be attached to a wheel in any suitable manner and in the present instance is attached by the employment of a clincher rim R attached to the felloe 3.

The pneumatic inner body comprises two concentric endless tubular sections 4 and 5, respectively, each of which is made of rubber or like flexible elastic material. The tubular section 5 is circular in cross sectional contour when inflated. The inner peripheral portion of the tubular section 5 is overlapped by the outer peripheral portion of the tubular section 4, the tubular section 4 being crescent-shaped in cross sectional contour when deflated and extending at opposite sides of the tubular section 5 between the outer wall of the latter and the inner wall of the outer casing 1 approximately half the distance from the median line of the inner peripheral portion of the tube 5 to the median line of the outer peripheral portion of the tube 5, as clearly shown in Figure 3.

With the arrangement just described, an endless air chamber 6 is defined within the tubular section 5 and an endless air chamber 7 is defined within the tubular section 4, the chamber 6 being circular in cross section when the tube 5 is inflated and the chamber 7 being circular in cross section when the tubular section 4 is inflated.

A tire valve stem 8 extends through radially aligned openings 9, 10, 11 and 12 in the inner peripheral portion of the tube 5, the outer peripheral portion of the tube 4, the inner peripheral portion of the tube 4 and the felloe 3, respectively, so that a flange 13 at the inner end of the valve stem 8 will be received within the chamber 6. The tire valve stem 8 passes through the slit 2 in the outer casing 1 between the openings 11 and 12 and protrudes from the opening 12 beyond the inner peripheral wall of the felloe 3. A nut 14 is disposed within the tubular section 4 in threaded engagement with the stem 8 and can be manipulated to cooperate with the flange 13 to clamp the interposed portion of the tubular sections 4 and 5 closely against each other so that the escape of air through the aligned openings 9 and 10 between the sections 4 and 5 is prevented. A disk 15 which surrounds the stem 8 within the tubular section 4 has a tubular extension 16 which extends through the opening 11 in airtight contact with the wall of the latter, and in spaced concentric relation to the tire valve stem 8, whereby an annular space 17 is defined between the tubular extension 16 and the tire valve stem 8 for the reception of a packing ring 18 which may be made of rubber or other suitable compressible material.

A felloe-member having a packing nut 19 is slidable on the stem 8 and is in threaded engagement with the portion of the tubular extension 16 that extends through the opening 11 in the slot 2. The nut 19 can be screwed on the tubular extension 16 until the packing ring 18 is compressed to an extent sufficient to seal the space between the tubular extension 16, the nut 19 and the tire valve stem 8 and to compress the portion of the tubular section 4 that is received between the nut 19 and the flange or disk 15 so that escape of air from the chamber 7 through the opening 11 is prevented. The portion 20 of said felloe-member extends through the opening 12 in the felloe and is screw-threaded to receive a nut 21. A pin P carried by the nut 14 whose free end is engageable in the recess in the nut 15, serves to permit of the application of nut 14 by the manipulation of nut 15.

A dust cap 29 having screw threaded portions 30 and 31 is provided. When the tube section 5 is inflated the cap 29 is arranged on the stem 8 with the portion 30 in threading engagement with the screw-threaded end 32 of the stem 8, and when the tube section 4 is inflated as in Figure 2 the portion 31 of the cap 29 is in threading engagement with the end 32 of the stem to hold the cap 29 in place.

The tire valve stem 8 is provided with a passage 22 which extends from the inner end of the tire valve stem longitudinally of the tire valve stem into the portion of the latter that is received in the chamber 7 and then opens at 23 into the chamber 7. A second passage 24 extends in the tire valve stem for the full length of the latter and is in open communication at its outer end with the chamber 6. An inwardly opening check valve 25 which may be the usual valve is disposed in the outer end portion of the passage 22, which is threaded as indicated at 26 for connection with the usual threaded connection of a pump or like source of pressure fluid supply. A valve 27 similar to the valve 25 is disposed in the outer end portion of the passage 24 which also is threaded at its inner end, as indicated at 28 for connection with the outlet member of a pump or the like.

From the foregoing description of the various parts of the device, the operation thereof may be readily understood. The inner pneumatic body comprising the tubular sections 4 and 5 can be quickly and easily placed within the casing 1 when the inner pneumatic body is deflated and the outer casing 1 with the inner pneumatic body therein then placed in the rim R so that the tire valve stem 8 will extend through the opening in the felloe element. Air can be forced through the passages 22 and 24 to inflate the tubular sections 4 and 5 as desired and as required to maintain the casing 1 in proper form and give a desirable buoyancy.

The tubular sections 4 and 5 being capable of inflation independently of each other afford means in a tire whereby a supply of air may be carried in one section—the section 5—which, when deflated because of a puncture or any other reason, can have its lost buoyant effect supplanted by a supply of air put into the section 4. Moreover, if desired, each of the sections 4 and 5 may be supplied with air putting them under substantially equal pressure so that in the event of a puncture of section 5, the section 4 will still give sufficient buoyancy to support the wheel to which the tire is attached, so that a vehicle of which the wheel is a part can proceed for a considerable distance without any appreciable injury to the tire casing or pneumatic body within the casing.

I claim:

1. In a tire structure, a plurality of inflatable inner tubes adapted to fit within a tire casing, a valve stem attached to and supported by the walls of said inner tubes, a packing element carried by the wall of one of said inner tubes and through which the valve stem slidably extends, said valve stem having separate passages therein which communicate respectively with the interiors of the inner tubes, and a check valve in each of said passages whereby to inflate and deflate said inner tubes.

2. In a tire structure, a plurality of inflatable inner tubes adapted to fit within a tire casing, a valve stem attached to and supported by the walls of said inner tubes, a packing element carried by the wall of one of said inner tubes and through which the valve stem slidably extends, said valve stem having separate passages therein which communicate respectively with the interiors of the inner tubes, a check valve in each of said passages whereby to inflate and deflate said inner tubes, and attaching means whereby to attach said packing element to a tire rim.

ANTHONY F. DEMBEK.